United States Patent [19]

Sousa

[11] Patent Number: 5,774,636
[45] Date of Patent: Jun. 30, 1998

[54] COLOR IMAGE PROCESSING APPARATUS FOR SMOOTHING COMPENSATION OF AN IMAGE

[75] Inventor: Hisashi Sousa, Kobe, Japan

[73] Assignee: Konica Corporation, Tokyo, Japan

[21] Appl. No.: 696,470

[22] Filed: Aug. 14, 1996

Related U.S. Application Data

[63] Continuation of Ser. No. 169,579, Dec. 17, 1993.

[30] Foreign Application Priority Data

Dec. 22, 1992 [JP] Japan ................................. 4-342640

[51] Int. Cl.⁶ ............................................ G06F 15/00
[52] U.S. Cl. ............................................ 395/109; 395/117
[58] Field of Search ............................ 395/101, 109, 395/110, 117, 118, 128, 129, 132; 358/501, 518, 529, 530, 532; 382/263, 266, 269, 254, 255, 258, 264, 268, 274; 345/428, 426, 114, 136, 147

[56] References Cited

U.S. PATENT DOCUMENTS

| | | | |
|---|---|---|---|
| 4,285,004 | 8/1981 | Morrison et al. | 358/10 |
| 4,468,692 | 8/1984 | Yamada et al. | 358/76 |
| 4,803,734 | 2/1989 | Ohishi et al. | 382/8 |
| 4,930,007 | 5/1990 | Sugiura et al. | 358/75 |
| 5,005,139 | 4/1991 | Tung | 364/519 |
| 5,029,108 | 7/1991 | Lung | 364/519 |
| 5,060,059 | 10/1991 | Mori et al. | 358/79 |
| 5,134,667 | 7/1992 | Suzuki | 382/22 |
| 5,168,552 | 12/1992 | Vaughn et al. | 315/109 |
| 5,208,663 | 5/1993 | Hiratsuka et al. | 358/75 |
| 5,313,291 | 5/1994 | Appel et al. | 358/501 |
| 5,333,069 | 7/1994 | Spence | 358/517 |
| 5,396,584 | 3/1995 | Lee et al. | 395/132 |
| 5,438,437 | 8/1995 | Mizoguchi et al. | 358/518 |

FOREIGN PATENT DOCUMENTS 0 167 165 A2  1/1986  European Pat. Off. .
0 480 637 A2  4/1992  European Pat. Off. .

OTHER PUBLICATIONS

Hai–An Zhu, "A Two Dimensional Smoothing Template for Digital Image Preprocessing" (IEE, IECON'90 Annual Conf.).

*Primary Examiner*—David K. Moore
*Assistant Examiner*—Gabriel I. Garcia
*Attorney, Agent, or Firm*—Frishauf, Holtz, Goodman, Langer & Chick

[57] ABSTRACT

An image processing apparatus for smoothing an image data includes: a first memory for storing an image data which includes color component data of yellow, magenta, and cyan for each pixel of the image data; a logical processor for superimposing the color component data pixel by pixel, and for generating processed image data; a comparator for comparing the processed image data with plural two-dimensional reference image patterns, and for selecting that one of the plural two-dimensional reference image patterns which coincides with the processed image data so that the pixel position data, corresponding to selected one of the plural two-dimensional reference image patterns, is generated; and a generator for generating color component signals of yellow, magenta, and cyan according to the pixel position data.

19 Claims, 9 Drawing Sheets

(A) YELLOW (B) MAGENTA (C) CYAN

(A) YELLOW  (B) MAGENTA  (C) CYAN

COLOR IMAGE PROCESSING APPARATUS FOR SMOOTHING COMPENSATION OF AN IMAGE

This application is a Continuation of application Ser. No. 08/169,579, filed Dec. 17, 1993.

BACKGROUND OF THE INVENTION

The present invention relates to a color printer or a color image processing apparatus in which a CRT is used.

Recently, improved image processing technique of "smoothing compensation" has been adopted to printers. In this case, "smoothing compensation" is defined as a technique in which the configuration of an outputted image is discriminated and a minimum unit forming the outputted image is further fractionalized for providing image compensation.

This technique has been employed since it is an effective means for monocolor image formation.

In general, color image data is composed of three pieces of image data resolved into three primary colors. For example, in the case of a CRT, the three colors of red, green and blue are used, and in the case of a color printer, the three primary colors of yellow, magenta and cyan (referred to as Y·M·C hereinafter), which are in a relation of complementary colors, are used.

When a conventional smoothing compensation is conducted on the color image data resolved into three complimentary colors, the smoothing compensation operation is conducted on each primary color.

Since smoothing compensation is provided to each primary color in the aforesaid case, a correlation of three primary colors is not reflected on the smoothing operation. Therefore, image tone is deteriorated when smoothing compensation is conducted, which is a problem in the prior art.

That is, the conventional smoothing compensation is suitable for monochrome image data, however, it is not suitable for color image data resolved into three primary colors.

The present invention has been achieved to overcome the aforesaid disadvantages of the conventional apparatus. It is an object of the present invention to provide a color image processing apparatus by which smoothing compensation can be conducted on not only monochrome image data but also color image data without deteriorating image tone.

SUMMARY OF THE INVENTION

In order to solve the aforesaid problems, a color image processing apparatus of the present invention includes: a first memory means for storing plural color component data, the unit of which is a pixel; a logical processing means for superimposing each color image data in the plural color component data by a unit of pixel; a second memory means for storing the data processed by the logical processing means; a comparison means for comparing the logically processed data stored in the second memory means with plural predetermined two-dimensional reference image patterns, and also for outputting an output pattern data corresponding to a coincident two-dimensional reference image pattern in the case where the logically processed data stored in the second memory means coincides with one of the plural predetermined two-dimensional reference image patterns, and also for outputting a pixel position data corresponding to the coincident two-dimensional reference image pattern; and a generation means for generating plural color component signals in accordance with the pixel position data.

Figure 3:
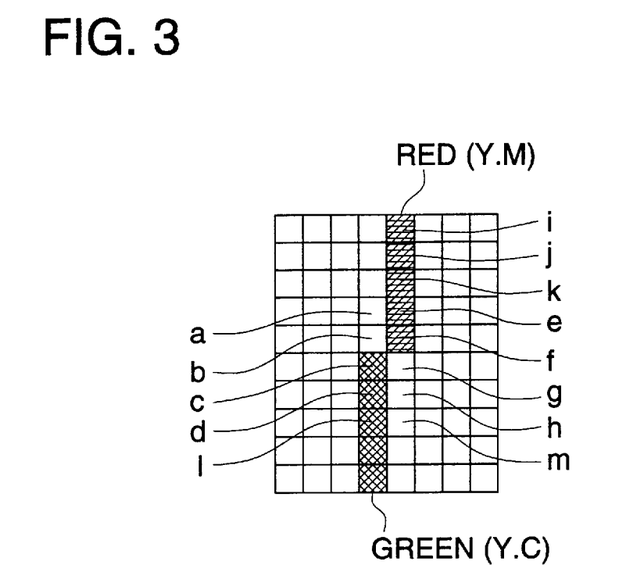
FIG. 3 is a view showing exemplary images of Y, M and C used for explanations of the present invention.

An outline of the operation of the present invention will be explained as follows in the case where an image shown in FIG. 3 is stored in the image data memory section 110 in the form of line data of Y, M and C shown by (A), (B) and (C) in FIG. 4.

Line data of Y, M and C are loaded into the shift register 201. In the shift register 201, the line data is developed in the form of two-dimensional image data of pixel unit for each of Y, M and C.

The image data is subjected to either of the following (1), (2) and (3) in the logic processing section 204.

The processing is not necessarily limited to the following three ways, but one way or two ways may be employed.

In this connection, in the case where a plurality of processing operations are prepared, it is necessary to provide a command setting conducted by a CPU, and also to provide a switching means for switching the processing.

$$\text{DATA} = Y + M + C \tag{1}$$

When the logical processing of (1) is performed, the image data of Y, M and C are superimposed.

$$\text{DATA} = Y \times M \times C \tag{2}$$

By the logical processing of (2), the image data of black regions is extracted from the image data of Y, M and C.

$$\text{DATA} = (Y + M + C) \times (\overline{Y \times M \times C}) \tag{3}$$

By the logical processing of (3), the image data of regions that are not black is extracted from the image data of (Y), (M) and (C).

In this case, (Y) denotes yellow image data, (M) denotes magenta image data, (C) denotes cyan image data, (DATA) denotes image data subjected to logical processing (DATA is referred to as logically processed data, hereinafter.), (+) denotes a logical sum, and (×) denotes a logical product.

A case in which logical processing of item (1) is performed will be briefly explained as follows.

Figure 5:
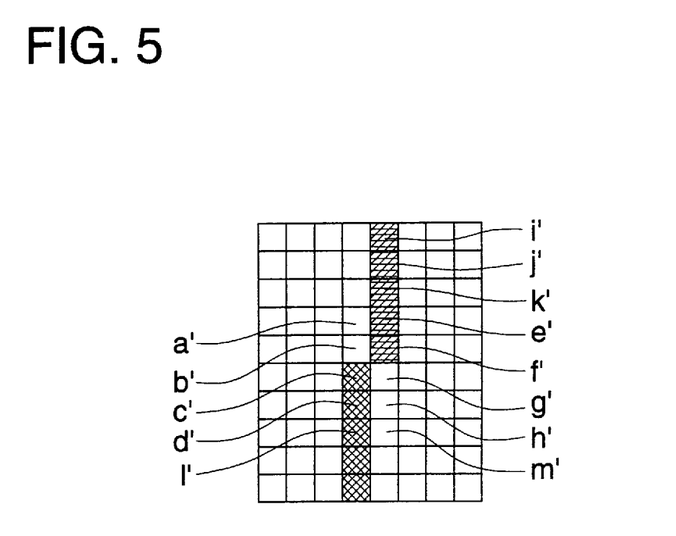
FIG. 5 is a view showing an example of two-dimensional development of logically processed data which has been provided when the image data of Y, M and C corresponding to the exemplary images in FIG. 3 is subjected to logical processing.

Image data of Y, M and C developed two-dimensionally in each shift register 201 is subjected to logical processing in the logical processing section 204, and superimposed and developed in the shift register 203 as illustrated in FIG. 5.

Figure 7:
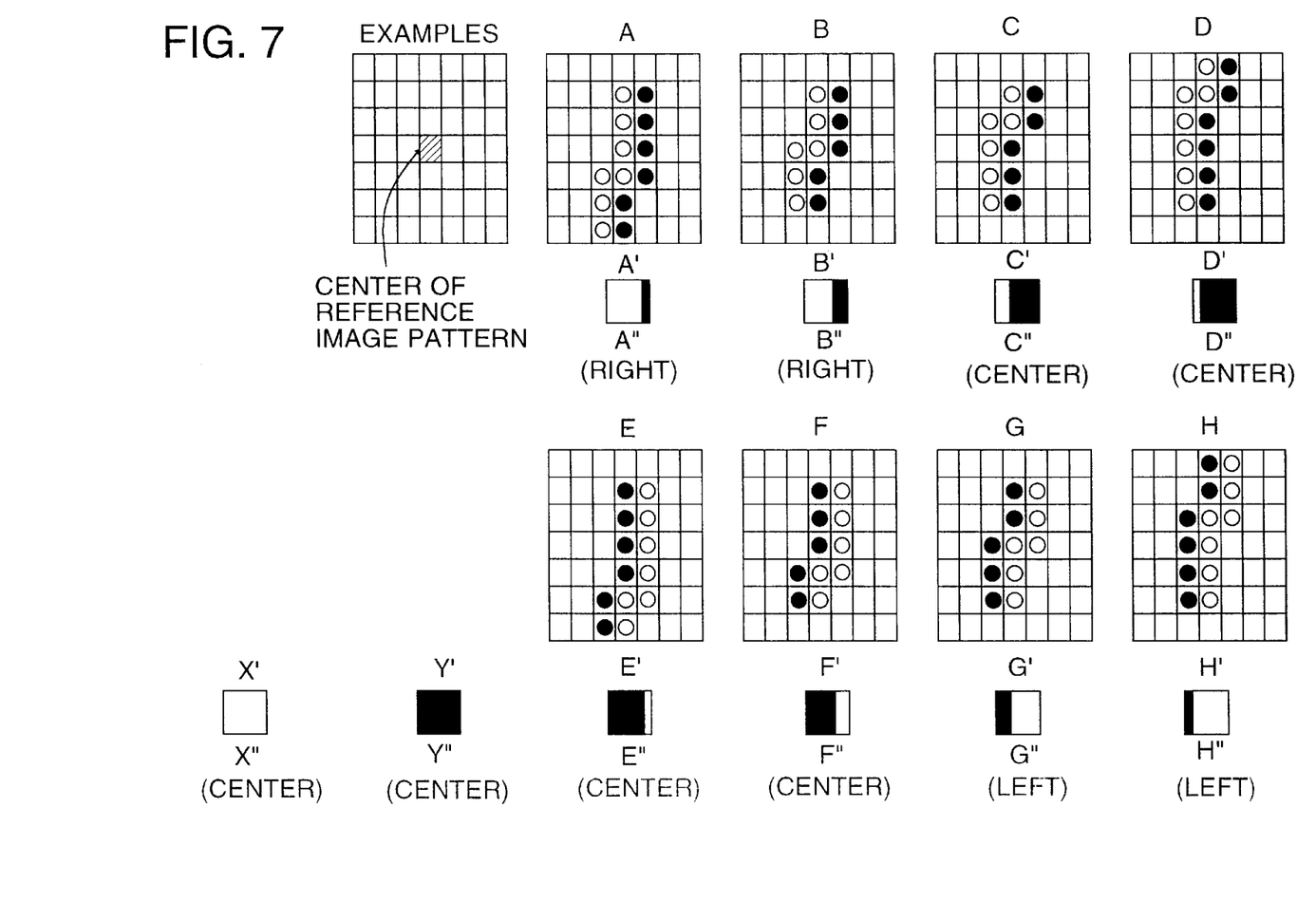
FIG. 7 is a view showing a reference image pattern, an output pattern corresponding to the reference image pattern, and a pixel position data corresponding to the reference image pattern.
Figure 13:
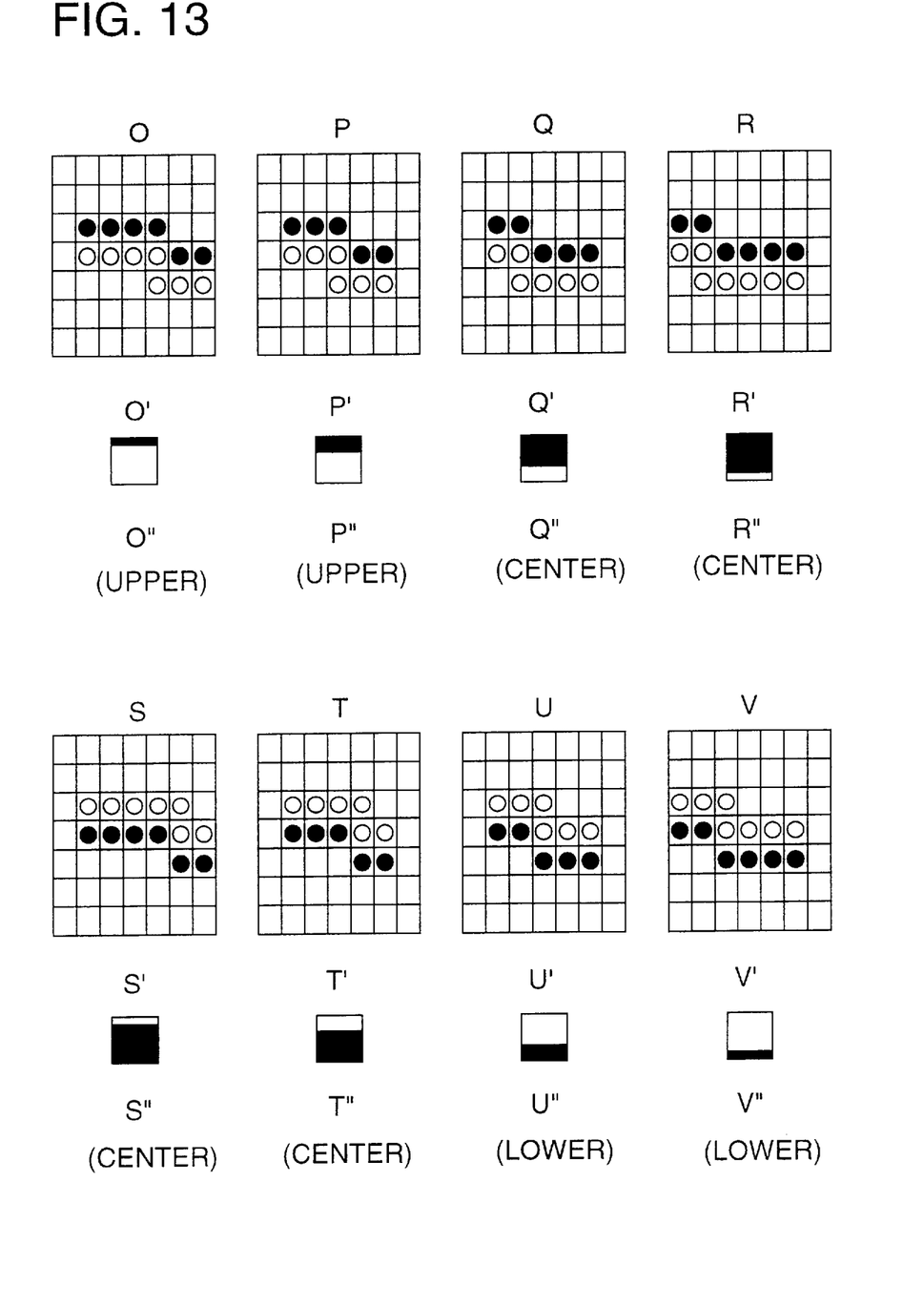
FIG. 13 is a view showing another reference image pattern, an output pattern corresponding to the reference image pattern, and a pixel position data corresponding to the reference image pattern.

The logically processed data which has been developed two-dimensionally is compared with a reference image pattern ((A) to (H) in FIG. 7, and (O) to (V) in FIG. 13) for each pixel of logically processed data.

The logically processed data and the reference image pattern are compared in the following manner:

When a specific pixel of logically processed data developed two-dimensionally (the specific pixel of logically processed data will be referred to as a target pixel, hereinafter) is adjusted at the center of each reference image pattern, it is judged whether or not the logically processed data developed two-dimensionally coincides with the reference image pattern.

In the case where the logically processed data does not coincide with any reference image pattern as a result of the comparison between the logically processed data developed two-dimensionally and the reference image pattern on the basis of the target pixel, the output pattern is selected in accordance with "there is a pixel" or "there is no pixel" with respect to the target pixel, wherein the case of "there is a pixel" is represented by (X') in FIG. 7, and the case of "there is no pixel" is represented by (Y') in FIG. 7. Therefore, the output pattern data corresponding to the output pattern is outputted from the pattern discriminating section 205.

In the case where the logically processed data coincides with at least one of the reference image patterns as a result of the comparison between the logically processed data developed two-dimensionally and the reference image pattern on the basis of the target pixel, a predetermined output pattern ((A') to (H') in FIG. 7, and (O') to (V') in FIG. 13) is selected as an output pattern corresponding to the target pixel. Accordingly, output pattern data corresponding to the output pattern is outputted from the pattern discriminating section 205.

This selecting processing operation is to convert a normal output pattern ((X') or (Y') in FIG. 7) of the logically processed data with respect to the target pixel, into a fractionalized output pattern ((A') to (H') in FIG. 7, and (O') to (VI) in FIG. 13). Therefore, this selecting processing operation functions to improve the quality of an outputted image.

Concurrently when the output pattern is selected in this selecting processing operation, pixel position data illustrated by (A") to (H") and (X") to (Y") in FIG. 7 and also illustrated by (O") to (V") in FIG. 13, is selected in relation to the selection of the output pattern, and the selected pixel position data is outputted from the pattern discriminating section.

The pixel position data is used for determining the color of the selected output pattern.

The pixel position data outputted from the pattern discriminating section 205 is inputted into the data selector 206. Then the data selector 206 selects and outputs the image data of Y, M and C in accordance with the inputted pixel position data.

Further, the aforesaid image data of Y, M and C is outputted from the image data compensating section 107 synchronously with the aforesaid output pattern data.

For example, when the target pixel is (a') shown in FIG. 5, the logically processed data developed in the shift register 203 coincides with the reference image pattern shown by (A) in FIG. 7.

In other words, when (a') shown in FIG. 5 is adjusted at the center of the reference image pattern of (A) in FIG. 7, a pixel arrangement of the logically processed data in FIG. 5 coincides with the reference image pattern of (A) in FIG. 7.

In this case, as an output pattern with respect to (a') in FIG. 5 which is a target pixel, (A') in FIG. 7 is selected, and (A") in FIG. 7 is selected as the pixel position data.

Since the content of (A") in FIG. 7 is [RIGHT], when the aforesaid pixel position data is inputted into the data selector 206, the image data of Y, M and C corresponding to (e') in FIG. 5 which is a pixel on the right of (a') in FIG. 5, is outputted from the data selector 206.

As described above, the output pattern data corresponding to (A') in FIG. 7, and the image data of Y, M and C corresponding to (e') in FIG. 5, are synchronously outputted from the image compensating section 107.

In this case, when consideration is given to (e) in FIG. 3, since the image data of Y, M and C corresponding to (e') in FIG. 5 is only (Y) and (M), only (Y) and (M) are outputted from the data selector 206.

Figure 6:
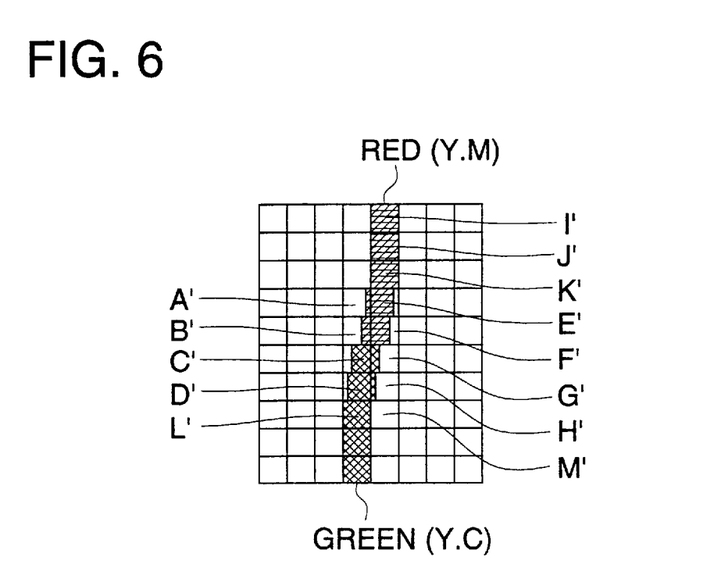
FIG. 6 is a view showing an example of output provided when the exemplary images in FIG. 3 are subjected to smoothing compensation by the color image processing apparatus of the present invention.

As a result of the foregoing processing, an image, the output pattern of which is (A') in FIG. 7 and the color of which is RED (Y·M), is expressed in the portion (a) in FIG. 3 as illustrated in (A') in FIG. 6.

When all the image data is subjected to the aforesaid processing, the image shown in FIG. 3 is outputted in the form of an image shown in FIG. 6. That is, smoothing compensation is conducted.

DETAILED DESCRIPTION OF THE INVENTION

With reference to the accompanying drawings, an example of the color image processing apparatus of the present invention will be explained as follows in the case where the apparatus is applied to a color printer.

Figure 1:
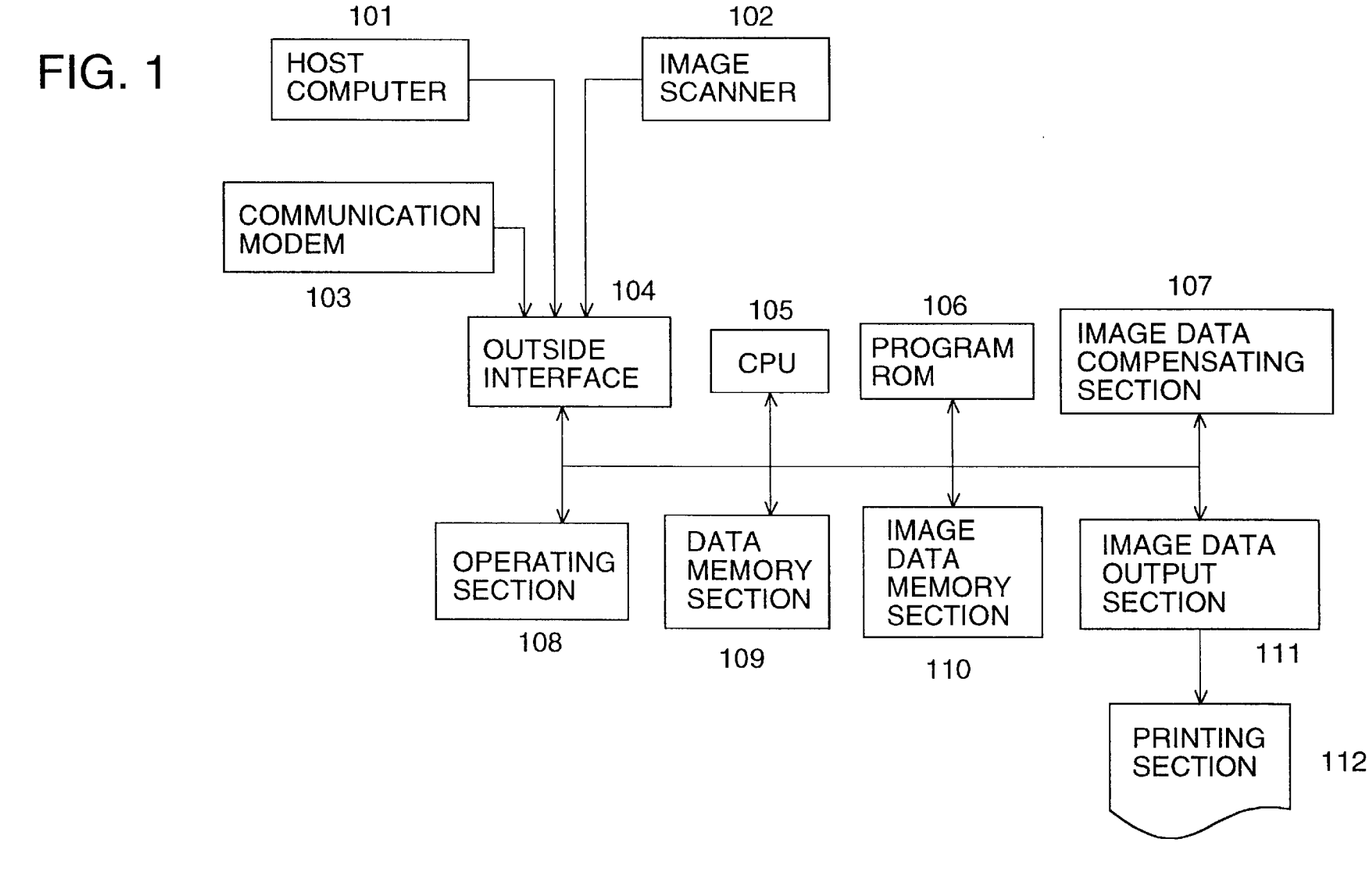
FIG. 1 is a block diagram showing an example of the circuit diagram of a color printer to which an example of the color image processing apparatus of the present invention is applied.

FIG. 1 is a block diagram showing an example of the circuit diagram of a color printer to which an example of the color image processing apparatus of the present invention is applied.

Print data is sent to the outside interface 104 from the host computer 101, scanner 102 and communication modem 103.

After that, the print data is temporarily stored in the data memory section 109, and then sent to the image data memory section 110 by the action of the CPU 105 so that the print data is stored in the image data memory section 110.

In this case, the CPU 105 is operated in accordance with the control program stored in the program ROM 106.

The image data stored in the image data memory section 110 is sent to the image data compensating section 107. In the image data compensating section 107, the image data is subjected to smoothing processing. Then, the image data is outputted to the printing section 112 through the image data output section 111. In this way, printing is conducted in the printing section 112.

In this case, the present invention is applied to a color printer. Accordingly, Y, M and C, which are the three primary colors in a relation of the complementary colors, are used for the image data.

Figure 2:
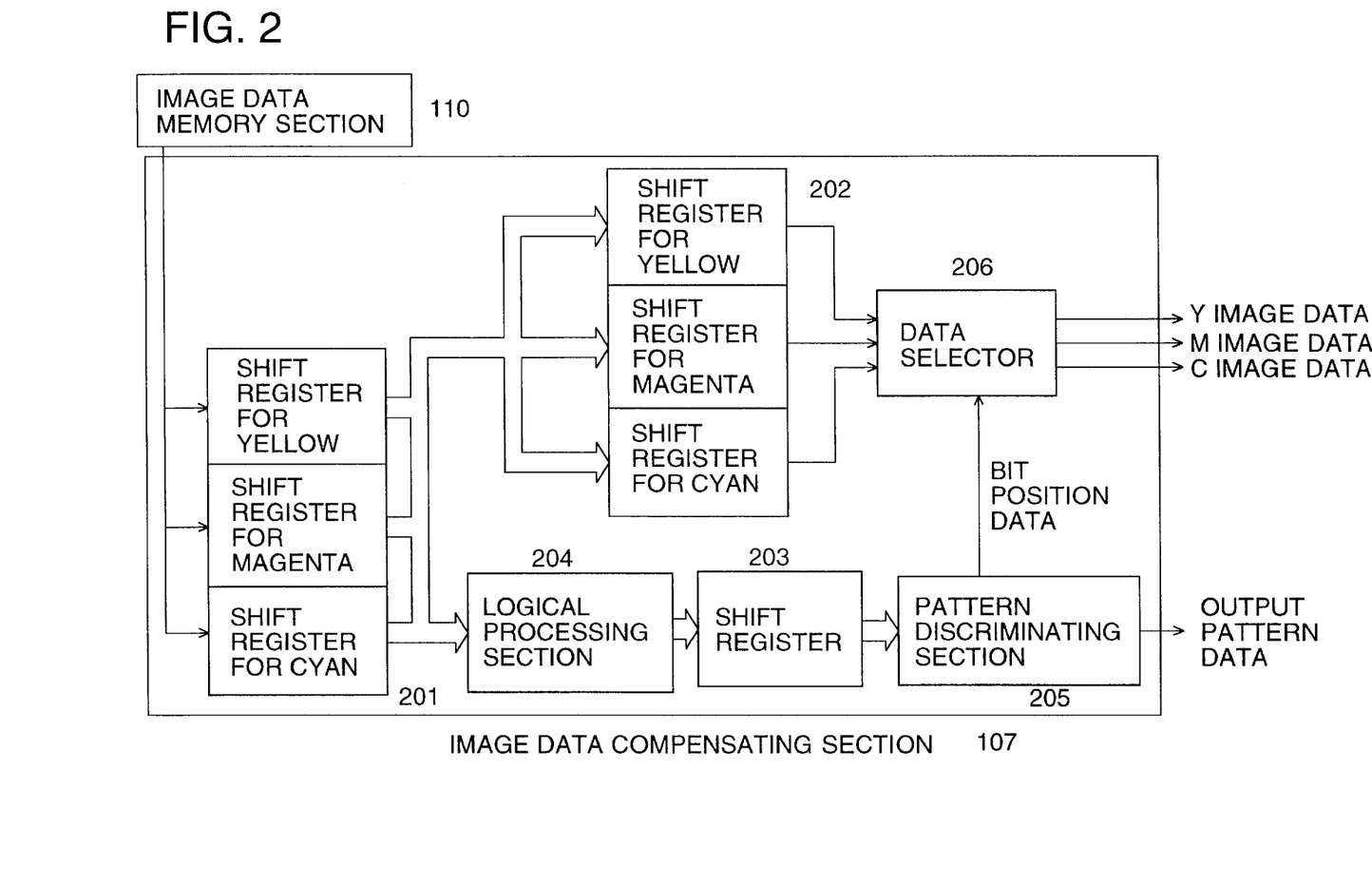
FIG. 2 is a block diagram showing an example of the image data compensation section 107 illustrated in the control circuit diagram in FIG. 1.

FIG. 2 is a block diagram showing an example of the image data compensation section 107 illustrated in the control circuit diagram in FIG. 1.

FIG. 3 is a view showing the examples of original images of the image data sent from the host computer 101, scanner 102 and communication modem 103. FIG. 6 is a view showing an example of output provided when the exemplary images in FIG. 3 are subjected to smoothing compensation by the color image processing apparatus of the present invention.

Figure 4:
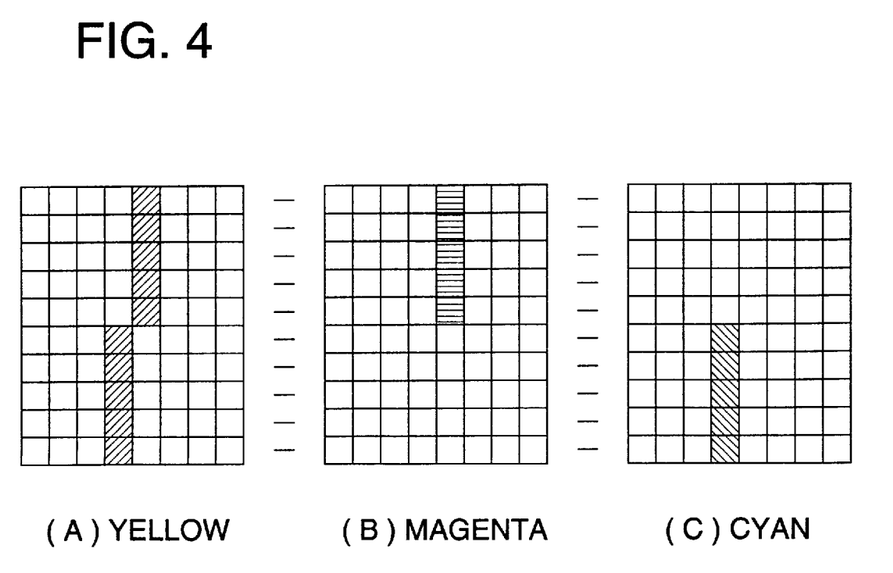
FIG. 4 is a view showing image data of Y, M and C corresponding to the exemplary images in FIG. 3.

In the case where an image shown in FIG. 3 is stored in the image data memory section 110 in the form of line data of Y, M and C as illustrated by (A), (B) and (C) in FIG. 4, the line data of Y, M and C is loaded in the shift register 201. Then, in the shift register 201, the line data is developed in the form of two-dimensional image data of pixel unit for each of Y, M and C.

This image data is successively sent to the shift register 202 in the next stage, and at the same time, the image data is also sent to the shift register 203 through the logical processing section 204.

The following are the explanations in the case where the logical processing conducted in the logical processing section 204 is:

$$\text{DATA} = Y + M + C. \quad (1)$$

In other words, the following are the explanations in the case where the image data of Y, M and C is superimposed.

In this case, the image data of Y, M and C is superimposed in the shift register 203. Then the image data is two-dimensionally developed in the form of logically processed data of pixel unit as illustrated in FIG. 5.

The aforesaid logically processed data is sent to the pattern discriminating section 205. Then the logically processed data is compared with a plurality of predetermined reference image patterns ((A) to (H) in FIG. 7, and (O) to (V) in FIG. 13) for each pixel.

The reference image patterns shown by (A) to (H) in FIG. 7 are examples of the patterns used for the smoothing operation with respect to a longitudinally diagonal line. The reference image patterns shown by (O) to (V) in FIG. 13 are examples of the patterns used for the smoothing operation with respect to a laterally diagonal line. Both of them are patterns of 7×7 pixel.

In (A) to (H) shown in FIG. 7 and (O) to (V) shown in FIG. 13, mark (●) represents "there is a pixel", and mark (○) represents "there is no pixel", and a vacancy represents "there is no relation to a pixel".

A comparison is made between the center of each reference image pattern (shown in FIG. 7) and a specific pixel (referred to as a target pixel hereinafter) in each logically processed data. Then, it is judged whether or not the logically processed data pattern which has been two-dimensionally developed coincides with any of the reference patterns.

A specific comparison method will be explained as follows.

A specific pixel (target pixel) in the logically processed data which has been two-dimensionally developed is compared with all the reference image patterns of (A) to (H) in FIG. 7 and (O) to (V) in FIG. 13. In the case where the target pixel does not coincide with any of the reference image patterns, the output pattern data and the pixel position data are selected according to "there is a pixel" or "there is no pixel" in the target pixel.

When the target pixel coincides with one of the reference image patterns of (A) to (H) in FIG. 7 and (O) to (V) in FIG. 13, the output pattern data and the pixel position data corresponding to the coincident reference image pattern are selected.

After one target pixel has been compared with the reference image patterns, the target pixel of the logically processed data is latterally shifted by one pixel, and the same comparing operation is performed. When one line of shifting and comparing operation has been completed, the target pixel is moved downward by one pixel, and a comparing operation is performed in the lateral direction in the same manner.

In the aforesaid manner, all the logically processed data is compared with the reference image patterns, and the output pattern data and the pixel position data are selected.

In other words, all the logically processed data is processed so that the data can become the target pixel.

In the case where the logically processed data and the reference image pattern are compared, it is necessary to provide 7×7 bits of logically processed data, wherein the target pixel is disposed at the center of the data. Therefore, the aforesaid 7×7 bits of logically processed data is sent to the pattern discriminating section 205 through the shift register 203.

In this connection, the pattern discriminating section 205 may be composed of a ROM. It may be also composed of a logic circuit.

Although it is not clearly shown in the drawings, an appropriate digital value may be set for the output pattern data with respect to each output pattern of (A') to (H'), (X') and (Y') in FIG. 7, and (O') to (V') in FIG. 13.

In the same manner, an appropriate digital value may be set for the pixel position data with respect to [CENTER], [RIGHT], [LEFT], [UPPER] and [LOWER].

As described above, image data for each of Y, M and C is sent to the shift register 202 from the shift register 201. In the data selector 206, at least image data of Y, M and C corresponding to the target pixel, and image data disposed in the right and left, and upper and lower positions of the image data, can be selected.

There is shown how (a) in FIG. 3 is processed. In this case, (a') in FIG. 5 corresponds to (a) in FIG. 3, and (a') is determined to be a target pixel.

When a comparison is made while the centers of all reference image patterns are adjusted at the target pixel, the provided pattern coincides with the reference image pattern of (A) in FIG. 7.

Accordingly, output pattern data corresponding to the output pattern of (A') in FIG. 7, and pixel position data of (A") in FIG. 7 are selected.

Since the content of the pixel position data is [RIGHT], the image data of Y, M and C according to the right ((e) in FIG. 3) of the image data is selected.

That is, when the pixel position data is inputted into the data selector 206, only image data of (Y) and (M) is outputted from the data selector 206.

Due to the foregoing, (a) in FIG. 3 is processed as shown by (A') in FIG. 6, and then the processed data is outputted.

Next, there is shown how (g) in FIG. 3 is processed.

In this case, (g') in FIG. 5 corresponds to (g) in FIG. 3, and (g') is determined to be a target pixel.

When a comparison is made while the centers of all the reference image patterns are adjusted at the target pixel, the provided pattern coincides with the reference image pattern of (G) in FIG. 7.

Consequently, output pattern data corresponding to the output pattern of (G') in FIG. 7, and pixel position data of (G") in FIG. 7, are selected.

Since the content of the pixel position data is [LEFT], the image data of Y, M and C according to the left ((c) in FIG. 3) of the image data is selected.

That is, when the pixel position data is inputted into the data selector 206, only image data of (Y) and (C) is outputted from the data selector 206.

Due to the foregoing, (g) in FIG. 3 is processed as shown by (G') in FIG. 6, and then the processed data is outputted.

Next, there is shown how (j) in FIG. 3 is processed.

In this case, (j') in FIG. 5 corresponds to (j) in FIG. 3, and (j') is determined to be a target pixel.

Even when a comparison is made while the centers of all the reference image patterns are adjusted at the target pixel, the provided pattern does not coincide with any of the reference patterns. Therefore, the output pattern data and the pixel position data are selected according to "there is a pixel" or "there is no pixel" with respect to (j') in FIG. 5.

In this case, (j') in FIG. 5 represents "there is a pixel". Therefore, output pattern data corresponding to the output pattern of (Y') in FIG. 7, and pixel position data of (Y") in FIG. 7, are selected.

Since the content of the pixel position data is [CENTER], image data of Y, M and C based on the image data ((j) in FIG. 3) is selected.

That is, when the pixel position data is inputted into the data selector 206, only the image data of (Y) and (M) is outputted from the data selector 206.

Due to the foregoing, (j) in FIG. 3 is processed in the manner of (j') in FIG. 6 and outputted.

Next, there is shown how (m) in FIG. 3 is processed.

In this case, (m') in FIG. 5 corresponds to (m) in FIG. 3, so that (m') in FIG. 5 is determined to be a target pixel.

Even when a comparison is made while the centers of all the reference image patterns are adjusted at the target pixel, the provided pattern does not coincide with any of the reference patterns. Therefore, the output pattern data and the pixel position data are selected according to "there is a pixel" or "there is no pixel" with respect to (m') in FIG. 5.

In this case, (m') in FIG. 5 represents "there is no pixel". Therefore, output pattern data corresponding to the output pattern of (X') in FIG. 7, and pixel position data of (X") in FIG. 7, are selected.

Since the content of the pixel position data is [CENTER], image data of Y, M and C based on the image data ((m) in FIG. 3) is selected.

That is, when the pixel position data is inputted into the data selector 206, no image data is outputted from the data selector 206.

Accordingly, as illustrated by (M') in FIG. 6, (m) in FIG. 3 outputs no image.

In the same manner, (b) in FIG. 3 outputs like (B') in FIG. 6, (c) in FIG. 3 outputs like (C') in FIG. 6, (d) in FIG. 3 outputs like (D') in FIG. 6, (e) in FIG. 3 outputs like (E') in FIG. 6, (f) in FIG. 3 outputs like (F') in FIG. 6, (h) in FIG. 3 outputs like (H') in FIG. 6, (i) in FIG. 3 outputs like (I') in FIG. 6, (k) in FIG. 3 outputs like (K') in FIG. 6, and (l) in FIG. 3 outputs like (L') in FIG. 6.

As described above, in accordance with the selected output pattern data, a substantial output configuration is determined with respect to the target pixel, and in accordance with the selected pixel position data, the color of the output configuration, that is, the image data of Y, M and C is determined with respect to the target pixel. Then the data is outputted from the data selector 206.

The output pattern data and the image data of Y, M and C are synchronously outputted from the image data compensation section 107, and printed in the printing section 112 through the image data output section 111.

As a result of the foregoing processing operation, the image shown in FIG. 3 is converted into an image subjected to smoothing processing as illustrated in FIG. 6.

A correlation of the image data of Y, M and C is reflected on the aforesaid processing, so that image tone can be maintained through the smoothing operation.

The following are the explanations in the case where the logical processing conducted in the logical processing section 204 is:

$$DATA = Y \times M \times C. \qquad (2)$$

In other words, the following are the explanations in the case where a black region is extracted from the image data of Y, M and C, and only the black region is subjected to the smoothing compensation processing.

Figure 8:
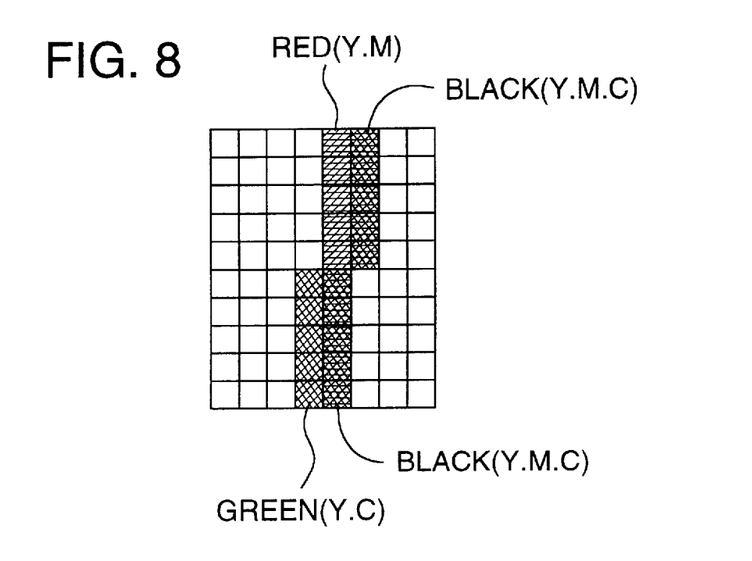
FIG. 8 is a view showing exemplary images of Y, M and C used for explanations of the present invention.
Figure 9:
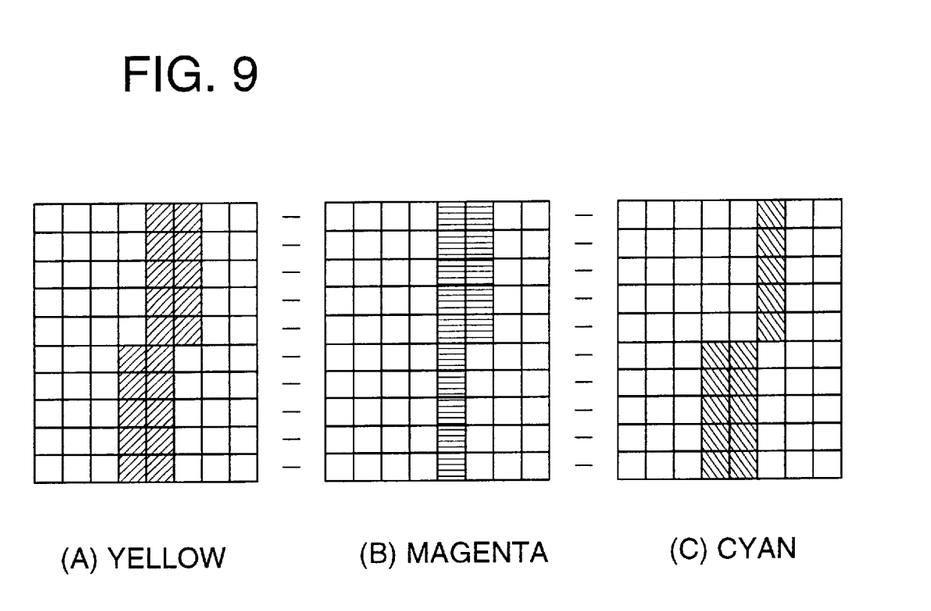
FIG. 9 is a view showing image data of Y, M and C corresponding to the exemplary images in FIG. 8.

In the case where the image shown in FIG. 8 is stored by the image data memory 110 in the form of line data of Y, M and C as illustrated in (A), (B) and (C) of FIG. 9, the line data of Y, M and C is loaded in the shift register 201. In the shift register 201, the data is two-dimensionally developed in the form of image data of pixel unit for each of Y, M and C.

Figure 10:
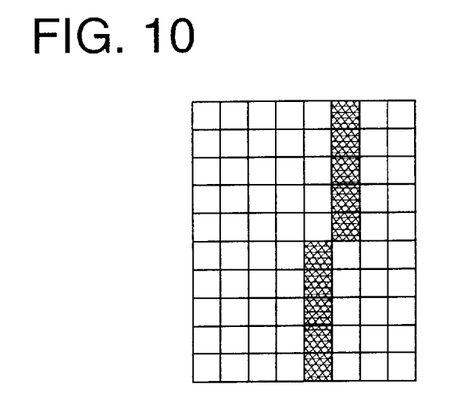
FIG. 10 is a view showing an example of two-dimensional development of logically processed data which has been provided when the image data of Y, M and C corresponding to the exemplary images in FIG. 8 is subjected to logical processing.

The aforesaid image data is subjected to the processing (2) in the logical processing section 204, and only the black region of the image data is two-dimensionally developed as illustrated in FIG. 10.

Figure 11:
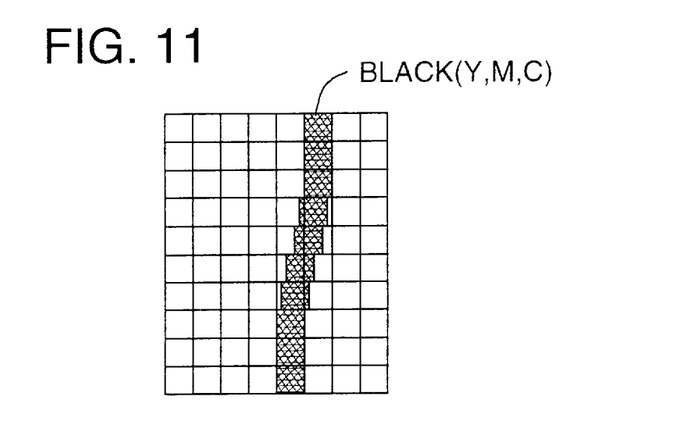
FIG. 11 is a view showing an example of output provided when the exemplary images in FIG. 8 are subjected to smoothing compensation by the color image processing apparatus of the present invention.

The logically processed data developed two-dimensionally as illustrated in FIG. 10 is compared with reference image patterns ((A) to (H) in FIG. 7, and (O) to (V) in FIG. 13) in the pattern discriminating section 205, and the data is subjected to the smoothing processing as described above. In this way, an output image shown in FIG. 11 is provided.

The following are the explanations in the case where the logical processing conducted in the logical processing section 204 is:

$$DATA = (Y + M + C) \times \overline{(Y \times M \times C)} \qquad (3)$$

In other words, the following are the explanations in the case where a region which is not black is extracted from the image data of Y, M and C, and only the extracted region is subjected to the smoothing compensation processing.

In the case where the image shown in FIG. 8 is stored by the image data memory 110 in the form of line data of Y, M and C as illustrated in (A), (B) and (C) of FIG. 9, the line data of Y, M and C is loaded in the shift register 201. In the shift register 201, the data is two-dimensionally developed in the form of image data of pixel unit for each of Y, M and C.

The aforesaid image data is subjected to the processing (3) in the logical processing section 204, and only the region of the image data which is not black is two-dimensionally developed as illustrated in FIG. 5.

The logically processed data developed two-dimensionally as illustrated in FIG. 5 is compared with reference image patterns ((A) to (H) in FIG. 7, and (O) to (V) in FIG. 13) in the pattern discriminating section 205, and the data is subjected to the smoothing processing as described above. In this way, an output image shown in FIG. 6 is provided.

In this connection, an output image shown in FIG. 12 can be provided in the following manner:

The image shown in FIG. 8 is subjected to the logical processing (2) described before, and then the image is further subjected to the logical processing (3) described before. When the output image shown in FIG. 6 and that shown in FIG. 11 are synthesized in the image data output section 111, the output image shown in FIG. 12 can be provided.

Figure 12:
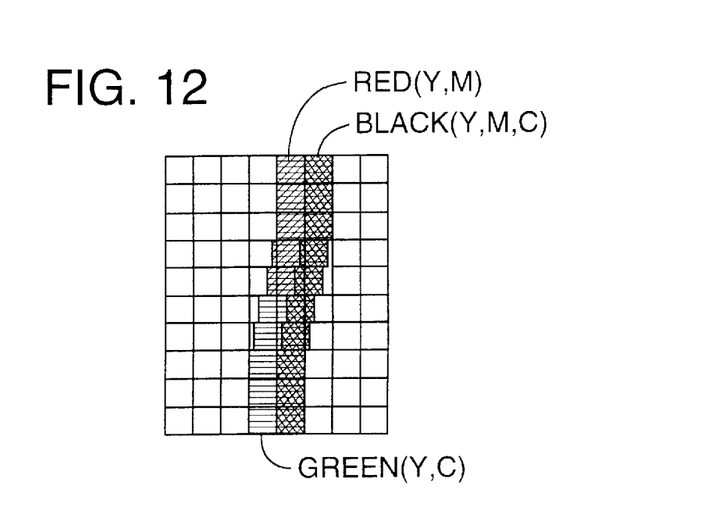
FIG. 12 is a view showing another example of output provided when the exemplary images in FIG. 8 are subjected to smoothing compensation by the color image processing apparatus of the present invention.

As described above, when the processing conducted by the logical processing section 204 is changed over, the image shown in FIG. 8 can be subjected to the smoothing processing so that the image shown in FIG. 6, 11 or 12 can be provided.

The processing conducted by the logical processing section 204 may be changed over by an original judgment of the CPU. Further, the processing conducted by the logical processing section 204 may be manually changed over by an operator when he operates the operating section 108.

In the above explanations, the case of longitudinally diagonal lines which are positioned from the upper right to the lower left is taken for an example. Since is provided a reference image pattern obtained when (A) to (H) in FIG. 7 are laterally reversed, longitudinally diagonal lines positioned from the upper left to the lower right can be also subjected to the smoothing processing in the same manner.

Moreover, in the color image processing apparatus of the present invention, since reference image patterns of (O) to (V) in FIG. 13 are provided, the same smoothing processing can be conducted on laterally diagonal lines positioned from the upper left to the lower right.

In the same manner, since is provided a reference image pattern obtained when (O) to (V) in FIG. 13 are laterally reversed, laterally diagonal lines positioned from the upper right to the lower left can be also subjected to the smoothing processing.

Due to the foregoing, color images of longitudinally and laterally diagonal lines can be subjected to the smoothing compensation. Therefore, according to the color image processing apparatus of the present invention, characters composed of various diagonal lines can be subjected to the smoothing compensation.

In this connection, the output pattern data outputted from the image data compensation section 107 may be outputted as it is, or alternatively the data may be further processed in accordance with the characteristics and function of the image data output section 111.

In the above explanations, only a system is described in which: as illustrated in FIG. 2, the logically processed data subjected to the processing in the logically processing section 204 is two-dimensionally developed in the shift register 203 as illustrated in FIG. 5; and then the data is compared with the reference image patterns in the pattern discriminating section 205. However, as illustrated in FIG. 14, it is possible to conduct the smoothing compensating operation on the data in a different image compensating section 307 in the same manner.

Figure 14:
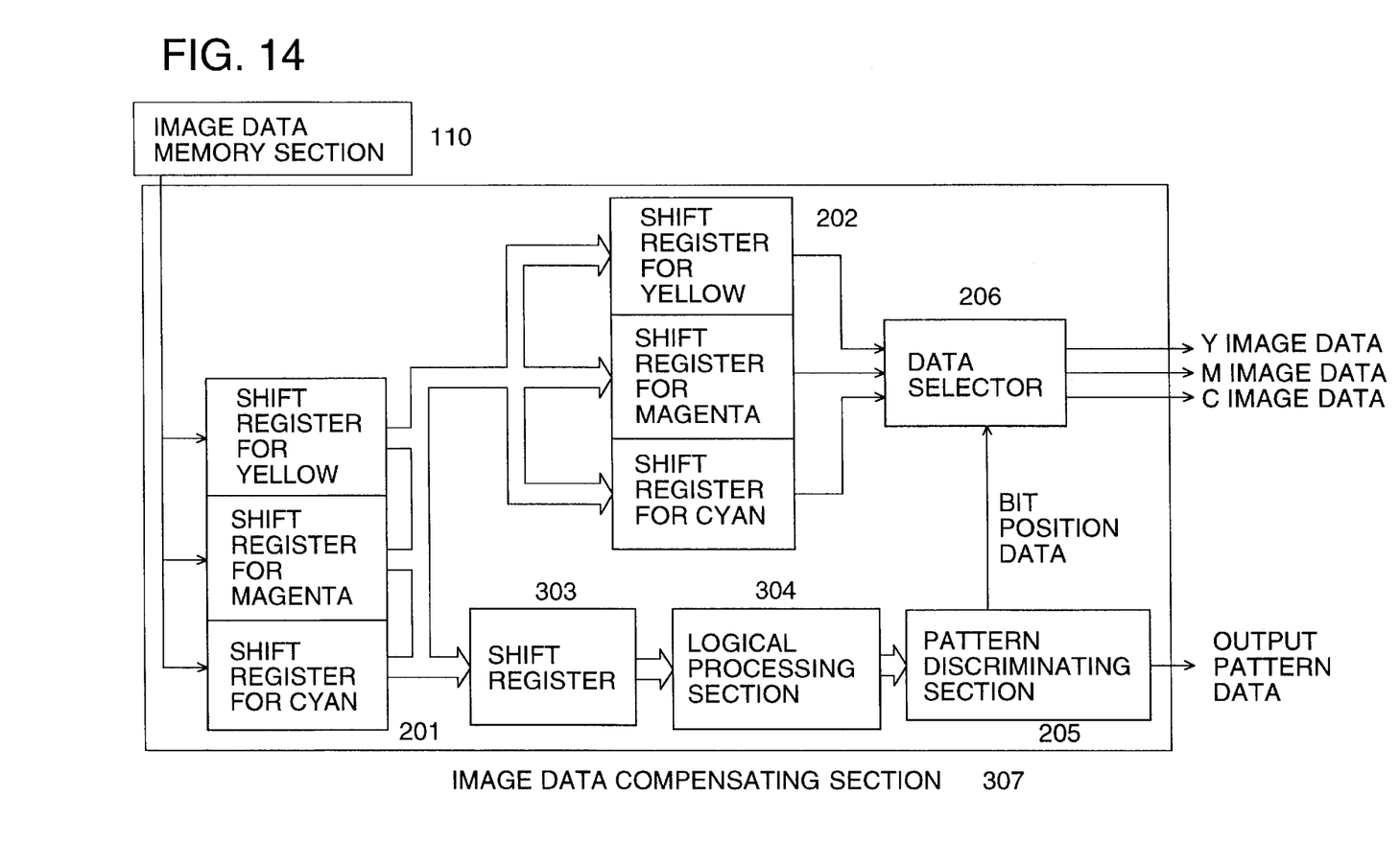
FIG. 14 is a block diagram showing another example of the image data compensation section 307 used for the color image processing apparatus of the present invention.

Like parts in FIG. 14 are identified by the same reference character.

In FIG. 14, the logically processed data outputted from the logically processing section 304 is directly inputted into the pattern discriminating section 205.

An example in which the color image processing apparatus of the present invention is used is explained above. When image data is expressed by R, G and B, the same smoothing processing can be applied to a displaying apparatus such as CRT.

As explained above, according to the color image processing apparatus of the present invention, smoothing compensation can be performed without affecting the image color.

What is claimed is:

1. An image processing apparatus for smoothing an outline of a color image, comprising:
   a first memory for storing an image data which includes color component data of yellow, magenta, and cyan for each of a plurality of pixels of the image data;
   a logical processor for superimposing said color component data of yellow, magenta and cyan for each of the plurality of pixels of the image data, pixel by pixel, said logical processor generating a processed superimposed image data for each of the plurality of pixels; and
   a smoothing compensation processor for generating a single output pattern data representing an output configuration in a current pixel for each said processed superimposed image data of the plurality of pixels, pixel-by-pixel, so as to determine a position of outputting in said current pixel, which produces a smoothed outline of the color image being processed;
   wherein said single output pattern data is generated for adjusting all of said color component data in combination.

2. The image processing apparatus of claim 1, wherein said logical processor extracts black pixel regions from said image data stored in said first memory.

3. The image processing apparatus of claim 1, wherein said logical processor extracts a region other than a black pixel region from said image data stored in said first memory.

4. The image processing apparatus of claim 1, wherein said plurality of predetermined two-dimensional reference image patterns include a first set of two-dimensional reference image patterns for processing said image data in a vertical direction and a second set of two dimensional reference image patterns for processing said image data in a horizontal direction.

5. The image processing apparatus of claim 1, wherein said smoothing compensation processor further generates pixel position data for extracting color component signals representing colors of yellow, magenta, and cyan of said processed superimposed image data for said current pixel.

6. The image processing of claim 5, wherein said logical processor extracts black pixel regions from said image data stored in said first memory.

7. The image processing apparatus of claim 5, wherein said logical processor extracts a region other than a black pixel region from said image data stored in said first memory.

8. The image processing apparatus of claim 5, wherein said plurality of predetermined two-dimensional reference image patterns include a first set of two-dimensional reference image patterns for processing said image data in a vertical direction and a second set of two-dimensional reference image patterns for processing said image data in a horizontal direction.

9. The image processing apparatus of claim 5, further comprising:
   a second memory for storing said processed superimposed image data;
   wherein said comparator compares said processed superimposed image data, stored in said second memory, with said plurality of predetermined two-dimensional reference image patterns.

10. The image processing apparatus of claim 1, further comprising:
    a second memory for storing said processed superimposed image data;
    and wherein said second memory is provided between said logical processor and said smoothing compensation processor, and said processed superimposed image data from said logical processor is developed in said second memory.

11. The image processing apparatus of claim 10, wherein said smoothing compensation processor further comprises a comparator for performing a pattern-wise comparison of said processed superimposed image data of a current pixel with a plurality of predetermined two-dimensional reference image patterns being representative of pixel locations and pixel vacancies, for determining which one of said plurality of predetermined two-dimensional reference image patterns coincides with said processed superimposed image data for said current pixel; and for generating a determined one of said plurality of predetermined two-dimensional reference image patterns as said output pattern data.

12. The image processing apparatus of claim 11, wherein said comparator compares said processed superimposed image data, stored in said second memory, with said plurality of predetermined two-dimensional reference image patterns.

13. The image processing of claim 11, wherein said logical processor extracts black pixel regions from said image data stored in said first memory.

14. The image processing apparatus or claim 11, wherein said logical processor extracts a region other than a black pixel region from said image data stored in said first memory.

15. The image processing apparatus of claim 11, wherein said plurality of predetermined two-dimensional reference image patterns include a first set of two-dimensional reference image patterns for processing said image data in a vertical direction and a second set of two-dimensional reference image patterns for processing said image data in a horizontal direction.

16. An image processing apparatus for smoothing an outline of a color image, comprising:
    a first memory for storing an image data which includes color component data of yellow, magenta, and cyan for each of a plurality of pixels of the image data;
    a logical processor for superimposing said color component data of yellow, magenta and cyan for each of the plurality of pixels of the image data, pixel by pixel, said logical processor generating a processed superimposed image data for each of the plurality of pixels; and
    a smoothing compensation processor for generating a single output pattern data representing an output configuration in a current pixel for each said processed superimposed image data of the plurality of pixels, pixel-by-pixel, by making a pattern-wise comparison of said processed superimposed image data of a current pixel with a plurality of predetermined two-dimensional reference image patterns which are representative of pixel locations and pixel vacancies, so as to determine a position of outputting in said current pixel, which produces a smoothed outline of the color image being processed;
    wherein said single output pattern data is generated for adjusting all of said color component data in combination.

17. The image processing apparatus of claim 16, wherein said smoothing compensation processor comprises:
    a comparator for performing said pattern-wise comparison;
    means for determining which one of said plurality of predetermined two-dimensional reference image patterns coincides with said processed superimposed image data for said current pixel; and
    means for generating a determined one of said plurality of predetermined two-dimensional reference image patterns as said output pattern data.

18. The image processing apparatus of claim 16, further comprising:
    a second memory for storing said processed superimposed image data;
    and wherein said second memory is provided between said logical processor and said smoothing compensation processor, and said processed superimposed image data from said logical processor is developed in said second memory.

19. An image processing apparatus for smoothing an outline of a color image, comprising:
    a first memory for storing an image data which includes color component data of yellow, magenta, and cyan for each of a plurality of pixels of the image data;
    a logical processor for superimposing said color component data of yellow, magenta and cyan for each of the plurality of pixels of the image data, pixel by pixel, said logical processor generating a processed superimposed image data for each of the plurality of pixels;
    a second memory for storing said processed superimposed image data; and
    a smoothing compensation processor, coupled to said second memory, for generating a single output pattern data representing an output configuration in a current pixel for each of said stored processed superimposed image data of the plurality of pixels, pixel-by-pixel, said smoothing compensation processing comprising:
       a comparator which makes a pattern-wise comparison of said processed superimposed image data of a current pixel with a plurality of predetermined two-dimensional reference image patterns which are representative of pixel locations and pixel vacancies; and
       means for determining which one of said plurality of predetermined two-dimensional reference image patterns coincides with said processed superimposed image data for said current pixel, and for generating output pattern data corresponding to a smoothed outline of the color image being processed; and
    wherein said single output pattern data is generated for adjusting all of said color component data in combination.

* * * * *